July 3, 1956
C. E. BARKALOW
2,752,789
DIRECTIONAL GYROS
Filed Aug. 28, 1945
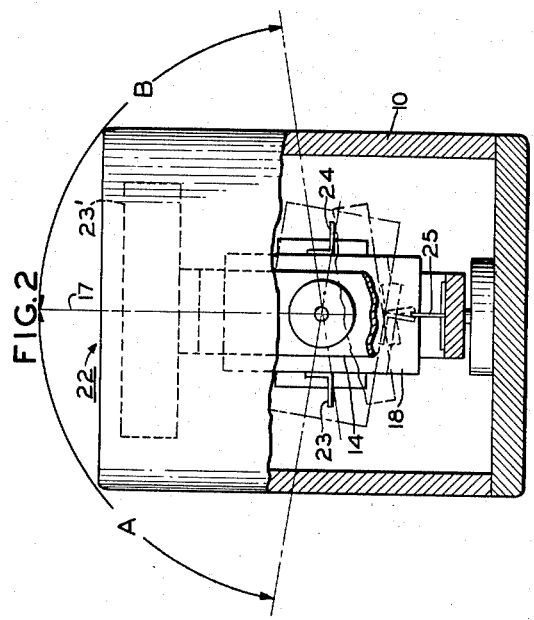
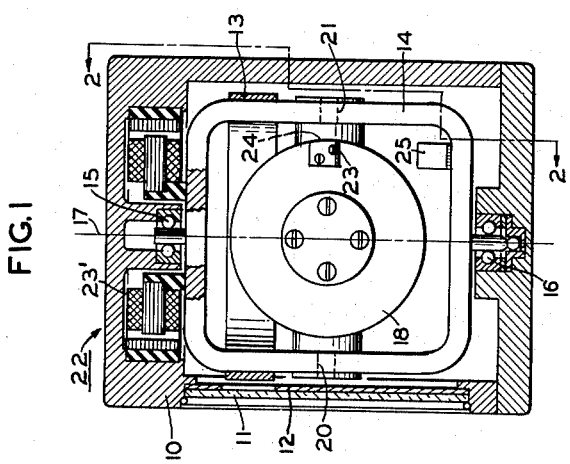
INVENTOR
CLARE E. BARKALOW
BY
his ATTORNEY.

United States Patent Office 2,752,789
Patented July 3, 1956

2,752,789

DIRECTIONAL GYROS

Clare E. Barkalow, Floral Park, N. Y., assignor, by mesne assignments, to Sperry Rand Corporation, a corporation of Delaware Application August 28, 1945, Serial No. 613,083

1 Claim. (Cl. 74—5.2)

This invention relates to directional gyroscopes whether of the free or slaved type for use on aircraft, in which the ordinary caging or locking means heretofore employed may be entirely omitted. Prior to my invention, the ordinary directional gyroscope for airplanes (see patent to Sperry, No. 1,974,220 for Direction Indicators, September 18, 1934) was equipped with both a caging mechanism to lock and/or reset the gyroscope at will and fixed stops positioned to limit the relative tilt of the vertical ring and gyro rotor case to an angle between 45 and 75 degrees. It was the standard practice of aviators to cage the gyroscope during any acrobatics or unusual attitudes because the gyroscope would strike the stops if the airplane pitched or banked more than the angle permitted by the stops, because if the gyro struck a stop, it would be caused to tumble, i e., to precess through such a large angle, either in azimuth or elevation, or both, that the readings would become useless and the gyro would temporarily cease to function as a free gyro.

In order to construct a directional gyroscope which would remain fully operative during acrobatics, it was first proposed to eliminate altogether both the stops and the caging mechanism. It was found, however, that if this were done and if the airplane assumed an attitude such as to cause the normally vertical axis of the vertical ring to approach alignment with the horizontal spin axis of the gyro (a condition which exists in approaching a vertical dive in case the spin axis of the gyro lies fore-and-aft) a phenomenon arose which has become known in the art as gimbal lock and which causes two types of disturbance: (1) As this alignment is approached, there is exerted on the gyroscope, probably through friction of the gimbals, a force tending to align the spin axis of the gyro with the outer trunnion gimbal axis, or the normally vertical axis in the case of a directional gyroscope. This force varies greatly depending upon whether the horizontal trunnion axis of the gyroscope is inclined at the time, the speed at which the loop is being gone through and other factors, but by proper design the errors may be held to within a few degrees in azimuth and elevation. The second and much more serious defect of the gimbal lock condition is that if the loop continues past the vertical, the gimbal or vertical ring is in nearly all cases caused to reverse itself, although the direction of the spin axis of the gyro remains the same. This phenomenon may be referred to as gimbal reversal, since it causes a 180 degree error in the reading of the directional gyroscope compass card, and hence gives rise to a condition that is no better than caused by the large angle stops heretofore employed.

By long continued experimentation, I have found it possible to eliminate the necessity for the cage during acrobatics by retaining limit stops, but positioning them at a much larger angle than heretofore, to permit relative tilt through an angle of over 80 degrees, but sufficiently less than 90 degrees to prevent the occurrence of gimbal reversal, and at the same time not to materially increase the first-mentioned gimbal lock errors, or to otherwise cause deviation or tilt of more than a few degrees. Hence, my improved directional gyroscope remains operative at all times regardless of acrobatics or unusual maneuvers. Although it may be slightly disturbed during unusual acrobatics, the disturbance is kept sufficiently small as not to cause it to lose its properties as a gyroscope and not to interfere with its continuing to be used after the maneuver for maintaining course. If the directional gyro is of the slaved type, any errors in course would be corrected by signals from the magnetic compass, while if it is of the ordinary free type, the aviator can reset the card from the magnetic compass by the resetting means thereon which may have a cage in connection therewith, as shown in the aforesaid patent to Sperry, or need not have such cage, such cageless resetting means being known in the prior art, two examples being shown in the prior patent to Carter, No. 2,093,417 for Directional Gyroscopes, dated September 21, 1937 and the patent to Bates, No. 2,363,495 for Directional Gyroscopes, dated November 28, 1944.

A further feature of the invention resides in the provision of a stop means of this character in which the limit piece on the vertical ring is provided in the form of a flat spring.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other features and structural details of the invention will be apparent from the following description when read in relation to the accompanying drawing wherein:

Fig. 1 is a side elevation view of a directional gyro embodying the invention with the casing thereof being illustrated in section; and Fig. 2 is a sectional view taken on line 2—2, in Fig. 1.

With reference to the drawing, a directional gyro having a direct reading compass card is employed to illustrate the present inventive concepts. It will be appreciated that the instrument may be of the remote reading type, if desired; that is, the instrument may be employed to control one or more repeater compasses as well known in the art. In the drawing, the parts of the conventional instrument illustrated include a casing 10 having a window 11 in the front wall thereof. Behind window 11 is a mask 12 with a suitable opening therein through which a side reading compass card 13 is visible. The instrument may be read by comparing the position of the graduated compass card 13 with a suitable fixed lubber's line (not shown) that may be situated on the window or mask. The ring may also position a movable pointer relative to a stationary compass card. Within the casing 10, a ring 14 is mounted to pivot about a normally vertical axis by means such as the upper and lower bearings 15 and 16. The axis of the ring 14 is indicated at 17, the same normally being parallel to or coinciding with the vertical or yaw axis of the craft on which the instrument is used. A rotor frame or case 18 is mounted on the ring 14 to pivot about a normally horizontal axis defined by trunnions 20 and 21. The arrangement of the frame and ring parts of the instrument is conventional, the frame further including a suitably spun rotor (not shown) that turns about an axis that is normally perpendicular to the vertical axis 17 of the ring and to the horizontal axis of the frame on the ring. As shown, the card 13 is fixedly mounted on the vertical ring 14 so that these parts are connected and the card is positioned in accordance with the position of the ring about its normally vertical axis 17.

Fig. 1 further shows a torque motor 22 of the squirrel-cage type, whose wound stator 23' forms a part of the vertical ring. The motor exerts a torque on the ring when effective to level the rotor frame about the axis defined by trunnions 20, 21. The circuits for controlling the motor are not shown as the same form no part of the present invention. Further, no means is shown for controlling the azimuthal position of the vertical ring. It will be understood that conventional slaving and levelling means may be employed in this connection.

As stated hereinbefore, instruments of this character have been necessarily provided with means for caging or holding the gyro in a fixed position relative to the casing 10 if the aviator intended to engage in acrobatics or unusual maneuvers. Such a cage in my improved instrument is not necessary and is therefore not shown. The primary purpose of the caging means was to maintain the gyro spin axis level and aligned with the craft until normal flight was resumed. While the instrument was thus temporarily rendered inoperative, it was held in a position where it might be released instantly and relied on immediately for maintaining straight flight. The cage also effectively prevented any possibility of a condition of gimbal lock and gimbal reversal being arrived at, conditions which arise when the spin axis of the rotor and the axis 17 and the ring 14 approach the pass through alignment.

In accordance with the invention, means are provided to prevent gimbal lock in the form of a pair of oppositely disposed stops or bosses 23 and 24 fixed to the rotor frame or case 18 and a limit piece in the form of a vertically disposed member or stop 25 that is fixedly mounted on the ring 14 which member may be in the form of a flat spring of suitable stiffness. These parts cooperate with one another as shown in Fig. 2 to limit the movement between the frame and ring to a predetermined range somewhat less than plus or minus 90° from the vertical as indicated by the angles A and B. For one design of directional gyroscope, good results were secured with the stops positioned to come into effect at angles (A or B, Fig. 2) of between ±83 and ±87 degrees. As shown in Fig. 2, when the craft moves so that its normally vertical yaw axis goes through a horizontal position either stop 23 or 24 engages the stop 25 to prevent a condition of gimbal lock from occurring in the instrument. By avoiding gimbal lock, the possibility of the relative positions of the ring and frame becoming reversed to cause 180° ambiguity in the indication of the compass card is also prevented. It is further unnecessary for the pilot of the craft to cage or uncage the improved directional gyro, so that the complicated and expensive cage of the prior art may be omitted entirely.

My invention also has the further advantage that high angle stops are struck much less frequently during loops than the stops of the prior art since it may be demonstrated that the stops are not ordinarily struck during a loop if the heading indicated by the directional gyro is greater than the plus or minus small angle that the stops are from the horizontal. In other words, if the stops are slightly less than ±5 degrees from the horizontal (i e., if A and B are slightly more than 85 degrees in Fig. 2), the stops are not struck during loops when the heading is between ±5 and ±175 degrees.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

In an aircraft directional gyro with a casing, a ring mounted in said casing to pivot about a normally vertical axis, a rotor frame mounted on the ring to pivot about a normally horizontal axis; a pair of oppositely disposed bosses on the frame, and a single flat, vertically disposed spring mounted on the ring cooperating with said bosses to limit the movement between the frame and ring to a range of slightly less than plus or minus 90° but substantially more than 80° from the vertical.

References Cited in the file of this patent

OTHER REFERENCES

| | | |
|---|---|---|
| 1,931,271 | Simmons | Oct. 17, 1933 |
| 1,974,220 | Sperry | Sept. 18, 1934 |
| 2,035,844 | Stachow | Mar. 31, 1936 |
| 2,086,896 | Carter | July 13, 1937 |
| 2,093,417 | Carter | Sept. 21, 1937 |
| 2,099,705 | Reichel | Nov. 23, 1937 |
| 2,222,754 | Von Freydorf | Nov. 26, 1940 |
| 2,363,495 | Bates | Nov. 28, 1944 |
| 2,452,473 | Kellogg | Oct. 26, 1948 |